United States Patent [19]

Walzer et al.

[11] Patent Number: 4,939,954
[45] Date of Patent: Jul. 10, 1990

[54] DRIVE SYSTEM FOR MACHINES AND VEHICLES, WITH A HYDRAULIC AND MECHANICAL TRANSMISSION ARRANGED THEREAFTER

[75] Inventors: Winfried Walzer, Elchingen; Thomas Sommer, Ulm-Jungingen, both of Fed. Rep. of Germany

[73] Assignee: Hydromatik GmbH, Elchingen, Fed. Rep. of Germany

[21] Appl. No.: 311,533

[22] Filed: Feb. 15, 1989

[30] Foreign Application Priority Data

Mar. 8, 1988 [DE] Fed. Rep. of Germany ....... 3807599

[51] Int. Cl.$^5$ ............................................. F16H 47/06
[52] U.S. Cl. ..................................... 74/733.1; 74/878
[58] Field of Search ................. 74/878, 877, 730, 731, 74/732, 733, 865, 866, 867, 687

[56] References Cited

U.S. PATENT DOCUMENTS

| | | | |
|---|---|---|---|
| 3,463,034 | 8/1969 | Miller | 74/733 |
| 3,713,351 | 1/1973 | Sakakibara et al. | 74/645 |
| 3,864,991 | 2/1975 | Nembach | 74/878 X |
| 4,079,638 | 3/1978 | Sibeud | 74/866 |
| 4,193,323 | 3/1980 | Bubula et al. | 74/733 |
| 4,334,441 | 6/1982 | Iwanaga et al. | 74/868 |
| 4,341,133 | 7/1982 | Sakamoto | 74/730 |
| 4,480,502 | 11/1984 | Nembach | 74/733 |
| 4,528,871 | 7/1985 | Nembach | 74/733 |
| 4,643,048 | 2/1987 | Hattori et al. | 74/877 X |
| 4,766,779 | 8/1988 | Massy | 74/733 |
| 4,776,233 | 10/1988 | Kita et al. | 74/687 |
| 4,815,334 | 3/1989 | Lexen | 74/687 X |

FOREIGN PATENT DOCUMENTS

2247437 8/1976 Fed. Rep. of Germany .
3433494 9/1984 Fed. Rep. of Germany .

*Primary Examiner*—Dwight Diehl
*Attorney, Agent, or Firm*—Scully, Scott, Murphy & Presser

[57] ABSTRACT

A drive system for machines and vehicles with a hydraulic and mechanical transmission arranged thereafter having a driving motor and a control member which can continuously vary the speed of the motor. A hydraulic converter also controlled by a control member dependent upon the speed of the driving motor and the running pressure of the motor is also provided, in which a transmission arranged after the converter and a shifting mechanism is connected to an electronic control circuit so that an operating element for shifting gears of the transmission may achieve a comfortable shifting behavior for the transmission. Shifting from a high gear to a low gear will occur only under the following conditions: (a) before shifting, the output speed of the hydraulic converter is below a certain predetermined value, and (b) before shifting, the transmission ratio of the converter reaches a specific minimum value caused by the working pressure of the motor.

13 Claims, 4 Drawing Sheets

DRIVE SYSTEM FOR MACHINES AND VEHICLES, WITH A HYDRAULIC AND MECHANICAL TRANSMISSION ARRANGED THEREAFTER

TECHNICAL FIELD OF THE INVENTION

The invention relates to a drive system for machines and vehicles, in particular a travelling drive system for construction vehicles such as wheel loaders, excavators and track-laying vehicles, comprising a driving motor of which the speed can be continuously varied by means of a control member; a hydraulic converter controlled depending on the speed of the driving motor and on the travelling pressure by means of a control device; and a transmission, in particular a change-under-load transmission, arranged after the converter; and shifting means for the transmission having an electronic control circuit and an operating element for shifting.

BACKGROUND OF THE INVENTION AND PRIOR ART

A driving motor of which the speed can be continuously varied by means of a control member, in particular a diesel engine, produces a torque that is nearly independent of its speed. Vehicles and driven machines however require very variable driving forces to overcome load or running resistances such as slopes, to produce thrust and/or tractive forces or to accelerate. Hence it should be possible to convert the power designed into the motor as completely as possible into working power in the drive system. This requirement is met by a converter connected between the driving motor and the transmission with a control dependent on the load (pressure) and input speed (driving speed) which decreases the transmission ratio of the converter as the speed to be delivered by the driving motor increases, and increases it as the load (running pressure) to be applied by the driving motor increases. Hence the purpose of the transmission (often a 2 or 3 gear transmission) is to increase the available range of transmission ratios of the drive system.

During the working phases of, e.g. a wheel loader, it always runs in first gear and varies its running speed by means of the variable diesel engine speed and by means of the converter. By using a multiple-ratio change-under-load transmission it is possible to change the mechanical transmission ratio even while running and even when under load. If in this case no measures are taken to adapt the output speed of the converter and the input speed of the mechanical transmission to one another, then owing to the stiffness of the overall drive complex a strong shifting jerk occurs which, depending on the actual running condition of the wheel loader, can interfere with the running behavior and the running stability to a greater or lesser extent.

With a drive system of the kind mentioned in the introduction, described and illustrated in DE-OS No. 34 33 494, the converter and its control means are used to synchronize the output speed of the converter with the input speed of the transmission that is to be expected after the shifting operation. Here the control means must carry out a completely different control response than is specified for it by the speed control. In this known arrangement an extremely complex control means is necessary, which not only increases manufacturing costs but also leads to increased wear and increased use of fuel. While synchronization can prevent jerks when shifting, in this known arrangement there are adaptation difficulties in the transition region between the synchronization control and the speed control.

OBJECT OF THE INVENTION

It is the object of the invention to design a drive system of the kind described in the introduction so that comfortable shifting behavior when shifting down to a lower gear is obtained in a simple manner.

SUMMARY OF THE INVENTION

To this end, in accordance with the invention the drive system is so arranged that a shifting operation from a higher to a lower gear only occurs when the following requirements for shifting are met:
 (a) before the shifting operation the output speed of the converter is below a certain value that can be set as desired,
 (b) before the shifting operation the transmission ratio of the converter reaches a certain minimum value which can be set as desired and is caused by the running resistance (working pressure).

In the arrangement according to the invention it is ensured that the drive system is always in a state of positive power transmission when shifting, namely a power flow from the driving motor to the transmission. When the output speed of the converter is higher than the input speed of the transmission determined by the desired lower gear there is, a certain shifting jerk. However in this case it is an acceleratory shifting jerk which has hardly any harmful effect on the travelling behavior at all, in contrast to a slowing down shifting jerk which arises when the output speed of the converter is lower than the input speed of the transmission determined by the desired lower gear and which, depending on the shifting point, can act so strongly that in extreme cases driving members such as the wheels of the vehicle can be blocked. The second feature (b) of the invention serves to ensure that the output speed of the converter after shifting is not so high that the converter could be damaged (protection against overspeeding). If in the arrangement according to the invention shifting, e.g. from second to first gear, is started at too high a travelling speed shifting does not occur. If the driver still wishes to shift to the lower gear he can do this by easing back the control member of the driving motor (gas release) or as the case may be by also applying the brake. The arrangement can then be such that shifting according to the invention occurs when the input speed of the transmission (e.g. running speed) is reduced to such an extent that the requirements (a) and (b) are met.

The shifting signal starting the shift is preferably stored in the electronic control means if the shifting requirements are not fulfilled, and the shifting operation is then carried out automatically when the shifting requirements are met.

In the arrangement according to the invention shifting from a higher to a lower gear thus only occurs if the output speed of the converter set by the control means is the same as or less than a speed value at which the output speed of the converter reached in the shifting operation, determined by the desired lower gear and depending on the respective driving speed, does not exceed a predetermined maximum output speed of the converter, and the transmission ratio of the converter has a minimum value at which the output speed of the converter set in the shifting operation by the control means is the same as or higher than the input speed of the gearbox determined by the desired lower gear.

In the arrangement according to the invention, in which the control depending on the load and speed is not given up and therefore transition difficulties as in the state of the art do not occur, the increase in the output speed of the converter for the purpose of meeting requirements (a) and (b) is achieved if the driving motor increases its speed on shifting gear owing to the absence of speed depression, whereby the output speed of the converter is also increased.

A further increase in speed occurs through the load-dependent change in transmission ratio when separating the coupling.

Depending on the design of the shifting step it may be necessary in addition to increase the output speed of the converter in order to meet the requirement (a) of the invention. In a case such as this the speed of the driving motor must be increased, which is ensured by a predetermined position of the control member (75% full throttle) with the control of the converter dependent on the speed and load still being maintained. In conventional drive systems it should be possible with the control member in positions of about 50%, preferably 75%, of the full throttle position to attain the desired increase in speed of the driving motor or the increase in the output speed of the converter during the period between releasing the coupling for the one gear and engaging it for the other gear.

The invention provides a simple and effective means to determine the transmission ratio of the converter and the afore-mentioned additional increase in speed of the driving motor or converter.

The first condition of the invention (condition (a)) can be met particularly easily if the interruption of the driving connection resulting when shifting due to the separation of the couplings in the transmission has a predetermined time span and the speed of the driving motor is increased.

It is possible to achieve the object of the invention both with a manual transmission and an automatic transmission.

With the use of a hydrostatic transmission as a converter according to the first requirement of the invention (condition (a)) can be met particularly easily because with a hydrostatic transmission, owing to the cessation in load when shifting, a special effect in the form of a "relaxation" occurs which leads to a sudden increase in the output speed of the hydrostatic transmission.

BRIEF DESCRIPTION OF THE DRAWINGS

The invention will now be described in more detail with reference to preferred exemplary embodiments of the invention shown in the drawings, in which.

DETAILED DESCRIPTION OF THE INVENTION

Figure 1:
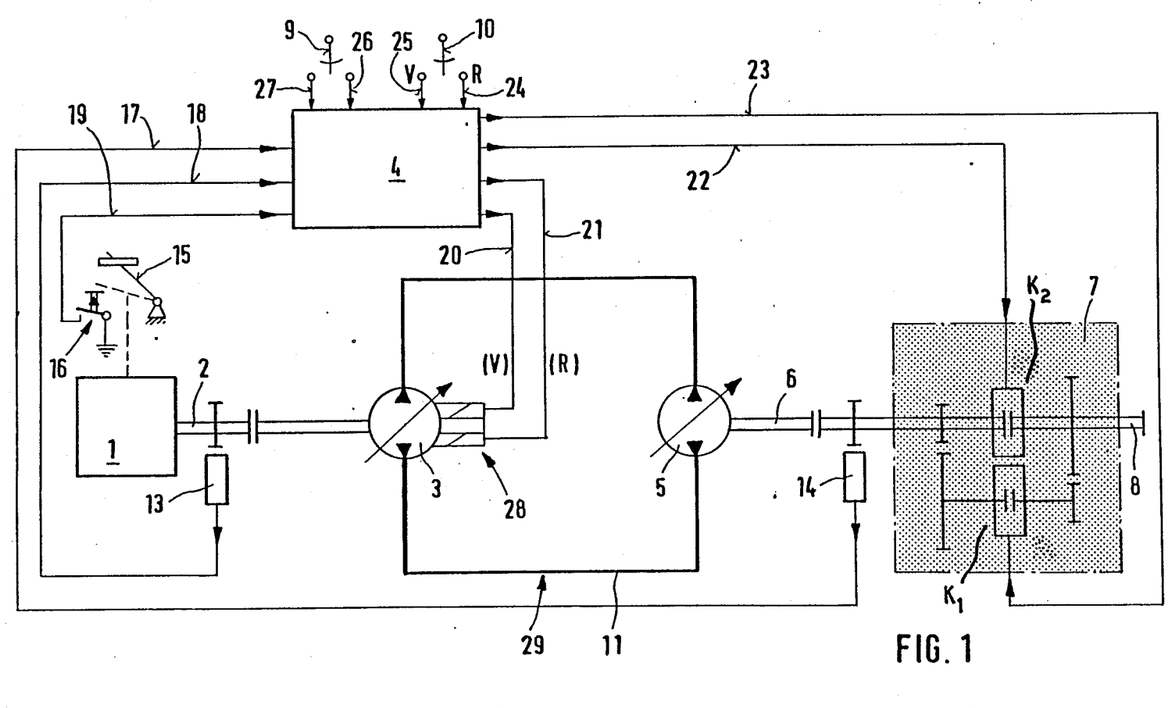
FIG. 1 shows, diagrammatically, a drive system designed according to the invention.

The essential parts of the drive system shown in FIG. 1 are a driving motor 1 of variable speed in the form of an internal combustion engine, in particular a diesel engine, having a drive shaft 2, a pump 3 of adjustable displacement driven by the latter which is adapted to operate in both directions of displacement, an electronic control means 4, a hydraulic motor 5 which is also adapted for both throughput directions and whose output shaft 6 is operatively connected to a change-under-load transmission 7, whose output shaft is indicated by 8, a preselecting element 9 with two functional positions I and II for preselecting a first and second gear, a further preselecting element 10 for forward and reverse movement V and R respectively, a revolution counter 13, in the case of a diesel engine suitably the terminals of the generator, associated with the drive shaft 2 or the shaft of the pump 3, a revolution counter 14 associated with the output shaft 6 of the hydraulic motor 5, and a detector 16 associated with the accelerator (gas pedal) 15 for the driving motor 1 which gives a signal when the accelerator is adjusted to the full throttle position range. The pump 3 and the hydraulic motor 5 are incorporated in a hydraulic circuit or a main line 11 in the usual manner.

The electronic control means 4 is connected by means of signal lines 17 to 27 to the revolution counters 13, 14, the detector 16, an adjusting device for the pump indicated generally by 28, which in the present exemplary embodiment has respective adjusting elements (signal lines 20, 21) for forward and reverse movement V,R, connected to couplings $K_1$ and $K_2$ of the change-under-load transmission 7 and to the preselector elements 9 and 10. In this exemplary embodiment the electronic control means 4 carries out both the control of the transmission ratio of the hydrostatic or converter transmission, indicated generally by 29, depending on the speed of the driving motor (revolution counter 13) and the control of the change-under-load transmission 7 for shifting. The control means 4 thus combines the function of a speed and load (pressure) dependent controller for the hydrostatic transmission 29 such that as the load (torque) to be applied by the driving motor 1 increases the transmission ratio of the hydrostatic transmission 29, is increased; i.e. its output speed, namely the speed of the hydraulic motor 5, is reduced.

Figure 2:
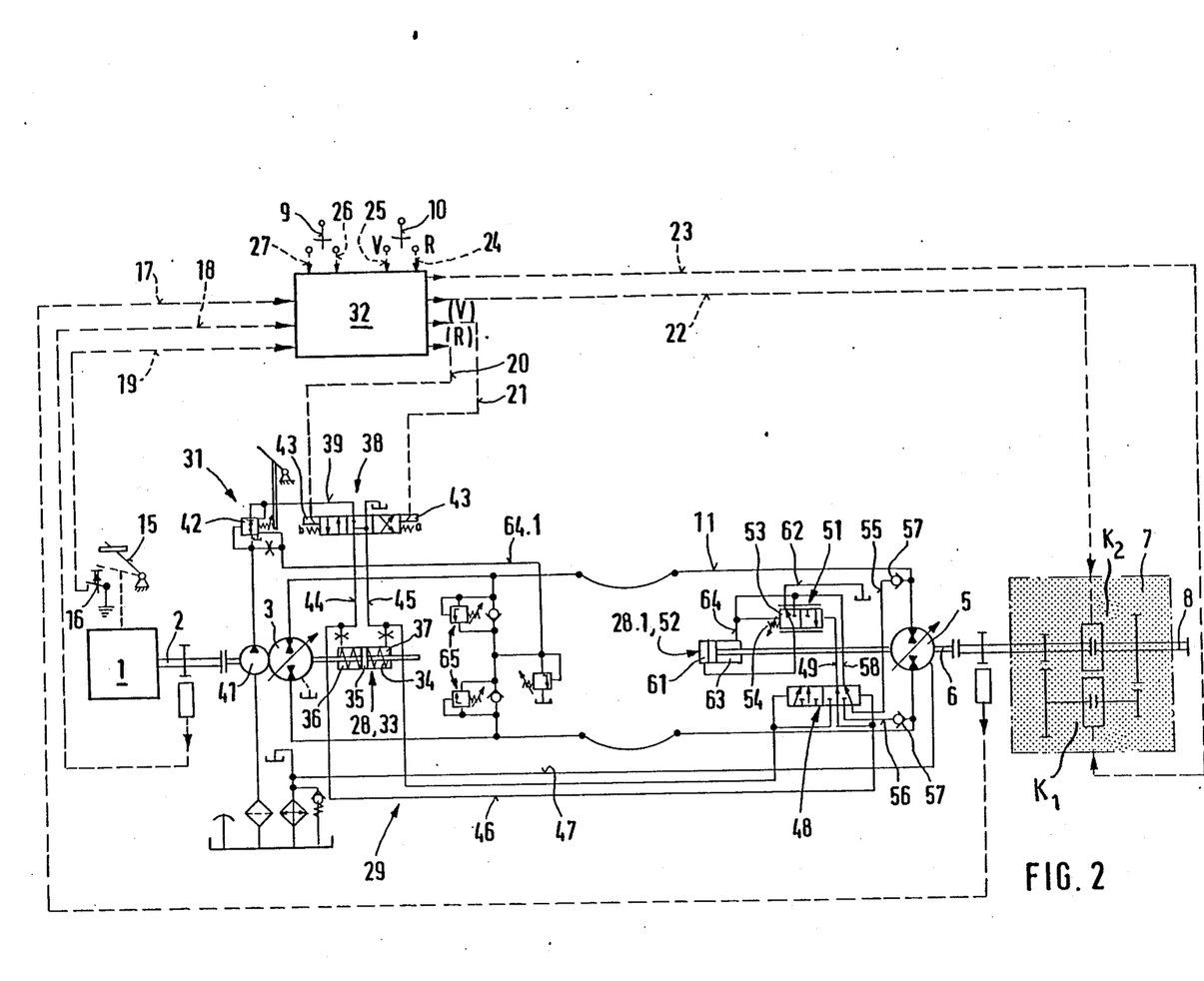
FIG. 2 shows a modified form of drive system designed according to the invention.

The exemplary embodiment shown in FIG. 2, in which the same parts have the same reference numerals, differs from the exemplary embodiment described above in that the control functions—control of the hydrostatic transmission 29 on the one hand and shifting control or control of the transmission 7 and forward and reverse movement on the other hand—are carried out by two devices 31, 32, of which the control means indicated by 31 is a hydraulic control while the electronic control means indicated by 32 carries out the electronic control of shifting and the forward and reverse movement as in the first exemplary embodiment according to the afore-mentioned difference. The hydraulic control means 31 is of the kind described in DE-PS No. 22 47 427, and reference is made to the valve indicated by the reference numeral 10 in that specification. The preselector element 10 corresponds to the reversing or directional control valve indicated in that specification by the reference numeral 23. To avoid repetition reference is made to the whole of the description contained in DE-PS No. 22 47 437.

The pump 3 of the exemplary embodiment shown in FIG. 2, whose output can also be adjusted in both directions of displacement, is adjusted by a hydraulic cylinder 33 forming the adjusting device 28, whose double piston 35, centered by springs 34, is adjustable by selectively loading the working chambers 36, 37. This is done by means of a directional control valve 38 which, by preselection of forward or reverse movement V, R, connects one or the other working chamber 36, 37 to the hydraulic line 39 into which an auxiliary pump 43 driven synchronously with the pump 3 delivers. In the hydraulic line 39 there is a so-called pressure compensator comprising a throttle (not shown) and a pressure control valve 42 arranged after this in the direction of flow which can be adjusted by the auxiliary pressure at the throttle in the hydraulic line 39. Associated with the directional control valve 38 are switching magnets 43 which can also comprise proportional magnets which act against springs, preferably adjustable, which are indicated in outline and are adjusted via the electric signal lines 20, 21 by the control means 32.

The hydraulic control means 31 is also arranged so as to act on the adjusting device 28.1 of the hydraulic motor 5. This purpose is served by further parts 46, 47 of the line sections 44, 45 between the directional control valve 38 and the hydraulic cylinder 33, which act on a pilot valve 48 which directs their throughput to a common control line 49 by means of which a pressure control valve 51 can be acted on which sets the adjusting device 28.1, which likewise comprises a hydraulic cylinder 52. The valve spool 53 of the pressure control valve 51 is acted on on one side by the auxiliary pressure of the hydraulic control means 31 and on its other side by the possibly reduced working pressure of the hydrostatic transmission 29 and at the same time by a spring 54, preferably adjustable. The working pressure is conducted through the line sections 55, 56 extending from the main line 11 in front of and behind the hydraulic motor 5, in which check valves 57, opening in the direction of the pilot valve 48, are arranged whose connection to a common control line 58 acting on the control spool 53 is also controlled by the pilot valve 48. The pressure control valve 51 is arranged in a return line 62 extending from the working chamber 61 of the hydraulic cylinder 52. The other working chamber 63 of the hydraulic cylinder 52 is connected by a line section 64 to the control line 58 and can thus be subjected to the working pressure. As a result of this both the working pressure and the auxiliary pressure act as control pressure on the pressure control valve 51 and as adjusting pressure on the piston of the hydraulic cylinder 52.

The arrangement is such that the hydraulic motor 5 is in the maximum swept volume setting when the load setting of the pump 3 is set on minimum, and is in the minimum setting when the pump 3 is set on maximum. Moreover the arrangement is such that the hydraulic motor 5 is only adjusted towards minimum swept volume when the pump 3 has reached its maximum delivery setting. The directional control valve 38 thereby controls both the pump 3 and the hydraulic motor 5 with regard to the respective direction of rotation.

The auxiliary circuit at the same time also serves to feed the main line 11 of the hydrostatic transmission 29, through a line 64.1 extending from the pressure control valve 42. Pressure limiting valves for the working pressure of the hydrostatic transmission 29 are indicated by 65.

The functioning of the arrangement according to the invention, in particular of that shown in FIG. 2, will now be described.

The input data required for the electronic regulating or control means 4, 32 are:

the rotational speed of the driving motor 1
the rotational speed of the hydraulic motor 5
the position of the gear shift 9 (gear I, gear II or also automatic)
the position of the switch 10 for the driving direction, and
a defined position of the accelerator 15 (e.g. full throttle).

As output data the shifting electronics of the regulating or control means 4, 32 supplies:
the electronic signals for controlling the operating of the couplings $K_1$, $K_2$ of the mechanical change-under-load transmission 7 and
the electronic signals for controlling the direction-of-movement changing magnets 43 (V, R).

The hydraulic arrangement in FIG. 2 is otherwise a conventional transmission with pump and motor adjustment dependent on the speed and pressure (Hydromatic-DA-control) as is customary in mobile vehicles.

It is the object of the electronic control to continuously determine the ratio of the speed of rotation of the hydraulic motor 5 and the driving motor 1 and to continuously monitor if there is a request to shift from the driver.

If a command to shift from gear I to gear II, shifting always takes place as there is a positive shifting jerk which causes little or no annoyance. This can be explained by the fact that when changing from gear I to gear II the quickly rotating hydraulic motor 5 has to be slowed down by the engagement of gear II to the lower speed level of gear I. In this case it is not possible to change the direction of the power flow, i.e. the vehicle always remains "pulling" (with the exception of the interval between opening the coupling for gear I and closing the coupling for gear II), i.e. the power is transmitted from the driving motor 1 to the change-under-load transmission 7.

If however there is a command to shift from gear II to gear I the electronic control means 4, 32 checks whether
the accelerator (gas pedal) is at full throttle (e.g. at least 50%, preferably at least 75%),
after shifting, the hydraulic motor 5 might possibly be overspeeding (e.g. when shifting down from too high a driving speed) and
whether the transmission ratio of the hydrostatic or converter transmission 29 as a result of the working pressure corresponds to a specific minimum value known to the electronic control means.

If one of these three shifting requirements is not met the electronic control stores the driver's desire to shift by means of an electronic circuit. If the driver shifts from gear II to gear I at a speed that is still too high there is at first no noticeable reaction at all. If he still wants to get into the lower gear he necessarily must remove his foot from the accelerator and possibly even apply the brake.

Figure 3:
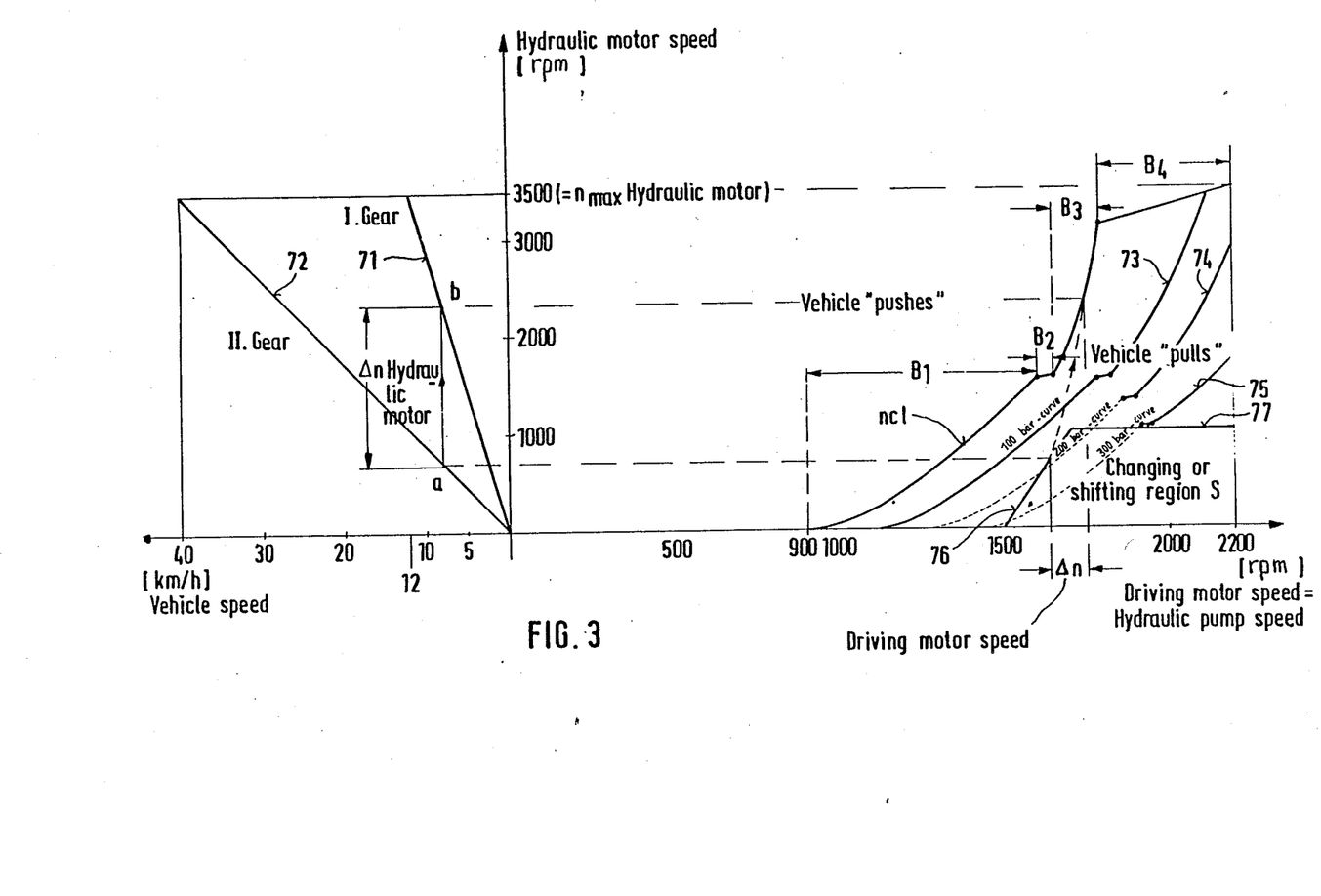
FIG. 3 shows a function diagram of the drive system according to the invention shown in FIG. 2.

FIG. 3 shows a functional diagram wherein the driving speed of the wheel loader, the speed of the hydraulic motor 5 and the speed of the driving motor 1 are plotted on the three axes.

In the driving speed/hydraulic motor speed diagram (left part in FIG. 3) there are a further two lines 71, 72 (gear I, gear II) plotted with the respective linear association of the driving speed of the wheel loader and the speed of the hydraulic motor.

In the hydraulic motor speed/driving motor speed diagram (right part in FIG. 3) a plurality of lines (curves) 73, 74, 75 at different driving pressures are plotted. The curve ncl beginning with the speed of the diesel engine n=900 rpm and leading obliquely upwards characterises the no-load condition of the mobile transmission (no-load condition curve) which results when the speed range of the diesel engine 1 runs without load. If the vehicle is driven, for example with jacked up wheels (pressureless) and with increasing diesel engine speed the resulting transmission ratio of the hydraulic transmission (between the speed of the diesel engine and the speed of the hydraulic motor) corresponds to the ncl curve. If however the vehicle moves under load the instantaneous operating point is as a rule always on a particular side of the ncl curve (below: vehicle pulls; above: vehicle pushes, so called thrust operation) since the speed of the hydraulic motor under load associated with the instantaneous speed of the diesel engine is always lower than the no-load hydraulic motor speed.

The reverse applies when the wheel loader is driven down hill with full scoops whereby the vehicle does not "pull" but is pushed by the load. Here the load is placed on the diesel engine 1 by way of the hydrostatic transmission 29, and the speed of the hydraulic motor associated with the instantaneous speed of the diesel engine is always greater than the speed of the hydraulic motor corresponding to the ncl curve (speed ratio is given by the ncl curve).

Moreover there are further curve sections plotted in the diesel engine speed/hydraulic motor speed diagram of FIG. 3 which show the connection between the speed of the diesel engine and the speed of the hydraulic motor, that is to say the transmission ratio of the hydrostatic transmission 29 in the case of different load pressures, i.e. with different running resistances. Here the region B1 of the curves always characterizes the region of pump adjustment. In the region B2 the increase in speed of the hydraulic motor 5 is due exclusively to the increase in speed of the diesel engine 1 (pump 3 on maximum displacement, hydraulic motor 5 on maximum swept volume). In the region B3 the hydraulic motor 5 is adjusted from maximum to minimum swept volume. In this region B3 the increase in speed of the hydraulic motor 5 thus occurs owing to the increase in speed of the diesel engine 1 and owing to its being returned to a smaller angle of tilt. In the region B4 the increase in speed of the hydraulic motor 5 again occurs exclusively owing to the increase in speed of the diesel engine 1 (=pump speed), with the pump 3 on maximum throughput and the hydraulic motor 5 on minimum throughput.

From FIG. 3 it is possible to see the attribute of the Hydromatic-DA-control system advantageous for the present invention, which is namely to increase the transmission ratio of the hydrostatic transmission 29 with increasing pressure, i.e. with increasing running resistance (load). By the transmission ratio of the hydrostatic transmission 29 is always meant the result of dividing the speed of the hydraulic pump by the speed of the hydraulic motor.

A further characteristic of the Hydromatic-DA-control system employed that is advantageous for the present invention can be seen in FIG. 3. If, as a result of sudden disconnection of the hydraulic motor 5 from the mechanical variable-speed transmission 7 (e.g. by opening the couplings for gear II), the hydrostatic transmission 29 and the diesel engine 1 which are under relatively high working pressure are abruptly unloaded, two effects occur which necessarily increase the speed of the hydraulic motor 5, which is important for relatively smooth engagement in the next lower gear (gear I). The first effect is that the hydrostatic transmission 29 "relaxes" (see FIG. 3, jump from e.g. the 300-bar curve 75 to the ncl curve), whereby at the existing pump speed (diesel engine speed) the setting of the pump 3 is increased and that of the hydraulic motor 5 is reduced, both of which lead to a sudden increase in the speed of the hydraulic motor 5 (larger displacement of the pump 3 and smaller swept volume of the motor 5). The second effect is that with sudden removal of the load but with unchanged accelerator (gas pedal) position the speed of the diesel engine 1 likewise abruptly increases (by about 10–16%) corresponding to the control characteristic of the injection pump control (e.g. Bosch all-speed regulator RSV). If now the shifting-release for shifting from gear II to gear I is additionally linked by way of the detector 16 (limit switch) to the requirement that the driver has depressed the accelerator 15 very far or completely, then on sudden removal of the load from the diesel motor 1 there is an additional increase in speed of the diesel engine 1 beyond said 10–16% due to the injection pump control (since there is certainly full throttle or an increased driving motor speed). In order to enable the hydraulic transmission 29 and the diesel engine 1 to "relax" or to increase their speed (pump speed) a certain minimum interval is required between opening the coupling for gear II and closing the coupling for gear I.

In the case of the afore-mentioned depression of the accelerator (gas pedal) 15 the additional increase in speed of the driving motor 1 occurs because of the position reached by the accelerator 15 before the shifting operation, preferably 75% full throttle or more. Here however the driving motor 1 has not yet reached its associated higher speed. If for example there is abrupt acceleration (kick-down) the accelerator position detector 16 immediately transmits the 75% (or more) end position (shifting release), but the driving motor 1 only reaches its associated higher speed some time later.

The shifting requirements are set such that the speed of the hydraulic motor 5 before shifting from gear II to gear I is in a specific region S which is bounded by the lines 76, 77, of which the line 76 is determined by the characteristic (a) and line 77 by the characteristic (b). If the speed ratio of the hydraulic motor 5 and the diesel engine 1 (hydraulic pump 3) is in this region (appreciably higher working pressure, i.e. appreciably greater running resistance than in the no-load condition on the ncl curve), and if the other shifting requirements are also met, the electronic control means 4, 32 first disengages the coupling for gear II (speed of hydraulic motor is at the speed indicated by point a). In the subsequent idle time (without any gear engaged) the speed of the diesel engine 1 and of the hydraulic motor 5 must now be able to increase as described above (by Δn-hydraulic motor in FIG. 3). The idle time must be long enough (a few tenths of a second) for the speed of the hydraulic motor 5 to increase to at least (preferably a little more than) the expected value of the input speed of the mechanical change-under-load transmission 7 in gear I (FIG. 3: point b) owing to conditions a and b above, or when the control member of the driving motor is in a position displaced from its idling position towards a fully depressed or full throttle position.

Within the scope of the invention realization of automatic gear shifting is also possible. The automatic version differs from the semi-automatic version in that depending on the speed of the hydraulic motor and depending on the gear just engaged the shifting command for changing the gear is automatically produced when reaching specific adjustable speed limiting values. The logic of shifting down is identical to the already described logic according to the invention of the speed adaptation of the hydraulic motor 5 to the mechanical change-under-load transmission 7. With the automatic version running behavior similar to an automobile with automatic transmission and kick-down effect can be attained.

Figure 4:
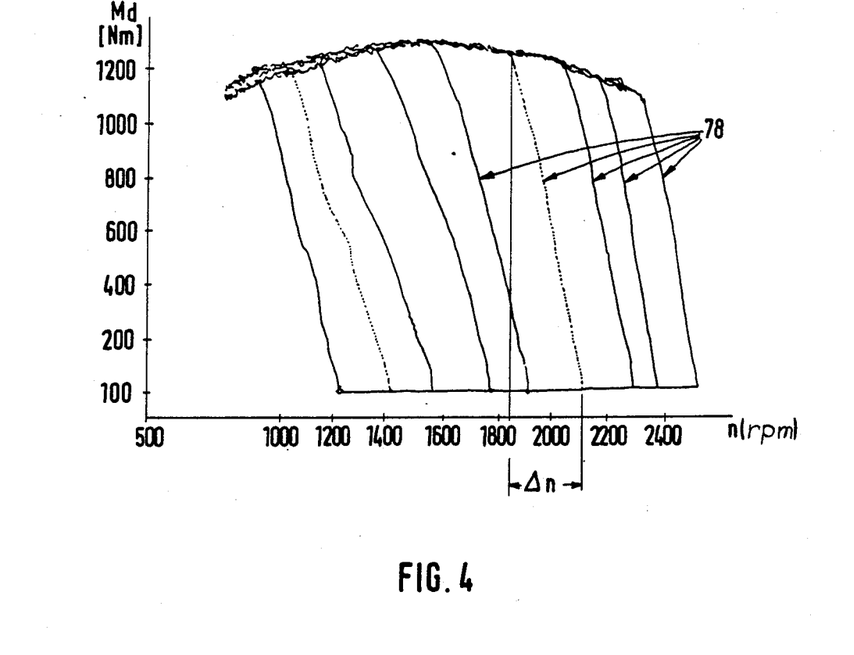
FIG. 4 shows a functional diagram.

The attainable torque-utilization of the driving motor 1 and the increase in speed on instantaneous unloading can be seen in FIG. 4. $\Delta_n$ in FIG. 4 (increase in speed with instantaneous abrupt unloading by disengaging the coupling under load) corresponds to $\Delta_n$ driving motor speed in FIG. 23 in the hydraulic motor speed/driving motor speed diagram. The lines indicated by 78 are constant control member positions or accelerator (gas pedal) positions. The torque delivered at the hydrostatic transmission 29 is indicated by $M_d$.

By means of the invention it is thus possible to increase to a considerable extent the running comfort of mobile vehicles with hydraulic, in particular hydrostatic converters followed by mechanical change-under-load transmissions while maintaining running safety without having to increase the outlay on hydraulics.

What is claimed is:

1. Drive system for machines and vehicles, in particular a traveling drive system for construction vehicles including wheel loaders, excavators and track-laying vehicles, comprising;
   a driving motor;
   a control member for variably continuously controlling the speed of said driving motor;
   a hydraulic converter responsive to a control device, said control device controlling said hydraulic converter according to the speed of the driving motor and on the traveling pressure of the driving motor;
   a transmission, in particular a change-under-load transmission, arranged after the hydraulic converter; and
   means for shifting the transmission, said means having an electronic control circuit and an operating element for shifting said transmission;
   wherein a shifting operation of said transmission from a higher to a lower gear occurs when the output speed of the hydraulic converter before shifting is below a certain predetermined value, and the transmission ratio of the converter before shifting is at a certain predetermined minimum value related to the working pressure of the motor.

2. Drive system according to claim 1, wherein the shifting command supplied by means of the operating element is stored if the shifting requirements are not met, and the shifting operation automatically occurs when the shifting requirements are met at a later time.

3. Drive system according to claim 1 wherein the shifting operation only occurs when the output speed of the converter is below a certain predetermined value before shifting, the transmission ratio of the converter reaches a predetermined minimum value related to the working pressure of the motor, and the control member of the driving motor is in a position displaced from an initial idling position towards a fully depressed position.

4. Drive system according to claim 3 wherein said position of the control member is in a last quarter of its adjusting path towards the fully depressed position.

5. Drive system according to claim 3 wherein a sensor determining the position of the control member is associated with said member.

6. Drive system according to claim 1 wherein in order to determine the transmission ratio of the converter a detector determining a speed of the driving motor in a value corresponding thereto and a detector determining an output speed of the converter and a value corresponding thereto are provided.

7. Drive system according to claim 1 wherein the driving motor is diesel engine having an all-speed regulator controlling an injection pump of said motor.

8. Drive system according to claim 1 wherein an interval between disengaging a high gear coupling and engaging a low gear coupling of the mechanical transmission is sufficient for the output speed of the converter, after the coupling for the higher gear has been disengaged, to increase to a desired transmission speed after engaging the coupling for the lower gear owing to the increasing driving motor speed resulting from a change in transmission ratio of the converter depending on load and speed.

9. Drive system according to claim 1 wherein shifting commands for shifting from the low to the high gear and from the high to the low gear are automatically produced depending on the respective just shifted gear and depending on the output speed of the converter.

10. Drive system according to claim 1 wherein the converter is a hydrostatic transmission having at least one hydraulic pump and at least one hydraulic motor, at least one of which has adjustable throughput.

11. Drive system according to claim 10 wherein the direction of said throughput is also reversible.

12. Drive system according to claim 10 wherein at least one of the hydraulic pump and the hydraulic motor is respectively adjustable by a hydraulic or electrohydraulic adjusting device.

13. Drive system according to claim 12 wherein the hydraulic adjusting device can be adjusted by a control pressure whose pressure depends on the speed of the driving motor.

* * * * *

UNITED STATES PATENT AND TRADEMARK OFFICE
CERTIFICATE OF CORRECTION

PATENT NO. : 4,939,954

DATED : July 10, 1990

INVENTOR(S) : Winfried Walzer, et al.

It is certified that error appears in the above-identified patent and that said Letters Patent is hereby corrected as shown below:

Column 3, line 45: delete "according to"

Column 4, lines 34-35: "or converter transmission," should read as --transmission or converter,--

Column 9, line 18: "Fig. 23" should read as --Fig. 3--

Signed and Sealed this

Twenty-sixth Day of November, 1991

Attest:

HARRY F. MANBECK, JR.

Attesting Officer   Commissioner of Patents and Trademarks